United States Patent
Moon et al.

(10) Patent No.: US 8,490,081 B2
(45) Date of Patent: *Jul. 16, 2013

(54) METHOD AND APPARATUS FOR INSTALLING SOFTWARE IN MOBILE COMMUNICATION TERMINAL

(75) Inventors: Eul-Ji Moon, Gyeonggi-do (KR); Hyuk Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/238,955

(22) Filed: Sep. 21, 2011

(65) Prior Publication Data

US 2012/0011497 A1  Jan. 12, 2012

Related U.S. Application Data

(63) Continuation of application No. 11/284,310, filed on Nov. 21, 2005.

(30) Foreign Application Priority Data

Nov. 20, 2004 (KR) .................. 10-2004-0095561

(51) Int. Cl.
*G06F 9/445* (2006.01)
*G06F 9/44* (2006.01)

(52) U.S. Cl.
USPC .......................... 717/174; 717/175; 717/177

(58) Field of Classification Search
USPC .......................... 717/168–176; 709/203–204
See application file for complete search history.

(56) References Cited

U.S. PATENT DOCUMENTS

| | | | |
|---|---|---|---|
| 6,219,693 B1 * | 4/2001 | Napolitano et al. | 709/203 |
| 6,256,664 B1 * | 7/2001 | Donoho et al. | 709/204 |
| 6,279,153 B1 * | 8/2001 | Bi et al. | 717/171 |
| 6,418,555 B2 * | 7/2002 | Mohammed | 717/169 |
| 7,050,859 B1 * | 5/2006 | Govindaraj et al. | 700/1 |
| 7,185,335 B2 * | 2/2007 | Hind et al. | 717/176 |
| 7,191,438 B2 * | 3/2007 | Bryant | 717/176 |
| 7,376,943 B2 | 5/2008 | Lu | |
| 7,496,627 B2 * | 2/2009 | Moorer et al. | 709/204 |

(Continued)

FOREIGN PATENT DOCUMENTS

| | | |
|---|---|---|
| KR | 1020040039515 | 5/2004 |
| KR | 1020040073150 | 8/2004 |
| KR | 100474215 | 3/2005 |

OTHER PUBLICATIONS

Srikanth et al, "Software installtion on a huge heterogenous network using mobile agents", IEEE, pp. 1049-1052, 2007.*

(Continued)

*Primary Examiner* — Anil Khatri
(74) *Attorney, Agent, or Firm* — The Farrell Law Firm, P.C.

(57) ABSTRACT

Disclosed is a method and an apparatus for installing software in a mobile communication terminal. The apparatus for installing software in a mobile communication terminal, includes an external memory having software to be installed, a detector of the mobile communication terminal for, if an external memory is plugged in the mobile communication terminal, detecting a plugging state of the external memory, a memory being embedded in the mobile communication terminal, and a controller of the mobile communication terminal for reading the software to be installed from the external memory and storing the software in the memory if connection with the external memory is detected.

14 Claims, 3 Drawing Sheets

U.S. PATENT DOCUMENTS

| | | | |
|---|---|---|---|
| 7,536,686 B2 * | 5/2009 | Tan et al. | 717/174 |
| 7,802,246 B1 * | 9/2010 | Kennedy et al. | 717/173 |
| 7,870,261 B2 * | 1/2011 | Baba et al. | 709/227 |
| 7,900,201 B1 * | 3/2011 | Qureshi et al. | 717/168 |
| 8,090,766 B2 * | 1/2012 | DePue et al. | 709/203 |
| 8,146,072 B2 * | 3/2012 | Trueba | 717/170 |
| 8,196,130 B2 * | 6/2012 | Chen et al. | 717/168 |
| 8,209,680 B1 * | 6/2012 | Le et al. | 717/174 |
| 8,312,444 B2 * | 11/2012 | von Khurja et al. | 717/173 |
| 8,327,351 B2 * | 12/2012 | Paladino et al. | 717/177 |
| 8,365,164 B1 * | 1/2013 | Morgenstern | 717/175 |
| 2003/0181956 A1 | 9/2003 | Duncan et al. | |
| 2004/0107328 A1 | 6/2004 | Schultz et al. | |
| 2004/0194081 A1 | 9/2004 | Qumei et al. | |
| 2006/0075284 A1 | 4/2006 | Skan | |

OTHER PUBLICATIONS

Neto et al, "Selecting software package for secure database installations", IEEE, pp. 67-74, 2011.*

Yukikazu et al, "A web based installation manual management system for open source software", IEEE, pp. 1261-1266, 2009.*

Tyndall, "Building an effective software deployment process", ACM 109-114, 2012.*

* cited by examiner

METHOD AND APPARATUS FOR INSTALLING SOFTWARE IN MOBILE COMMUNICATION TERMINAL

PRIORITY

This application is a Continuation of U.S. application Ser. No. 11/284,310, which was filed in the U.S. Patent and Trademark Office on Nov. 21, 2005 and claims priority to an application entitled "Method and Apparatus for Installing Software in Mobile Communication Terminal" filed in the Korean Intellectual Property Office on Nov. 20, 2004 and assigned Serial No. 10-2004-0095561, the contents of which are incorporated herein by reference.

BACKGROUND OF THE INVENTION

1. Field of the Invention

The present invention relates to an apparatus and a method for installing software in a mobile communication terminal, and more particularly to an apparatus and a method to upgrade or restore software to a mobile communication terminal using an external memory.

2. Description of the Related Art

Generally, in order to update application programs of a mobile communication terminal (e.g., a portable telephone), a user connects a USB cable to a mobile communication terminal, so that the application programs can be downloaded to the mobile communication terminal from a personal computer (PC) through the USB cable.

However, because the USB cable and a PC program are conventionally the only manner for downloading such application programs, it is inconvenient and cumbersome for the user.

In the meantime, when power is applied to the mobile communication terminal, a booting program must be executed prior to application programs and booting must be successfully achieved in order to enable the execution of the application programs. In a typical booting procedure, the typical booting procedure sets up a central processing unit (CPU) and a clock, initializes a memory (e.g., SDRAM) for an operation, reads a boot program stored in a non-volatile memory into the initialized memory, and then executes the boot program in the initialized memory.

However, if errors have occurred in the boot program, high-priced equipment, such as the Joint Test Access Group (JTAG), is required in order to repair the erroneous boot program.

Herein, the term "boot program" denotes a program performing operations required before application programs are executed. For example, the boot program performs operations required when an application program for upgrading software is downloaded. Accordingly, if errors have occurred in the boot program, it is difficult to perform operations required when an application program for upgrading software is downloaded. In addition, the boot program initializes hardware before application programs are executed and reads and loads the application programs to a random access memory (RAM) from a non-volatile memory such that the application programs can be executed. Therefore, an erroneous boot program may cause serious problems.

In the meantime, equipment such as the JTAG is required in order to repair the erroneous boot program. In addition, the JTAG requires only skilled developers as well as a high price, so general users rarely repair the erroneous boot program using the JTAG. In addition, it is difficult for a service center to obtain the JTAG. Furthermore, the hardware of a mobile communication terminal must be modified in most cases in order to connect the JTAG thereto. For this reason, sometimes, the repair of the erroneous boot program may be abandoned, and the mobile communication terminal may no longer be used.

SUMMARY OF THE INVENTION

Accordingly, the present invention has been made to solve the above-mentioned problems occurring in the prior art, and an object of the present invention is to provide an apparatus and a method for installing software in a mobile communication terminal using an external memory without additional equipment or additional programs.

To accomplish the above objects, according to a first aspect of the present invention, there is provided an apparatus for installing software in a mobile communication terminal, the apparatus including an external memory having software to be installed, a detector of the mobile communication terminal for, if an external memory is plugged in the mobile communication terminal, detecting a plugging state of the external memory, a memory being embedded in the mobile communication terminal, and a controller of the mobile communication terminal for reading the software to be installed from the external memory and storing the software in the memory if connection with the external memory is detected.

According to a second aspect of the present invention, there is provided a method for installing software in a mobile communication terminal using an external memory having the software, the method including the steps of determining if the external memory is plugged in the mobile communication terminal and if software installation is requested, and if so, repeating an operation of reading data from the external memory by a predetermined size and storing the data in a corresponding block of a memory embedded in the mobile communication terminal until all data stored in the external memory are read and stored in the embedded memory.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
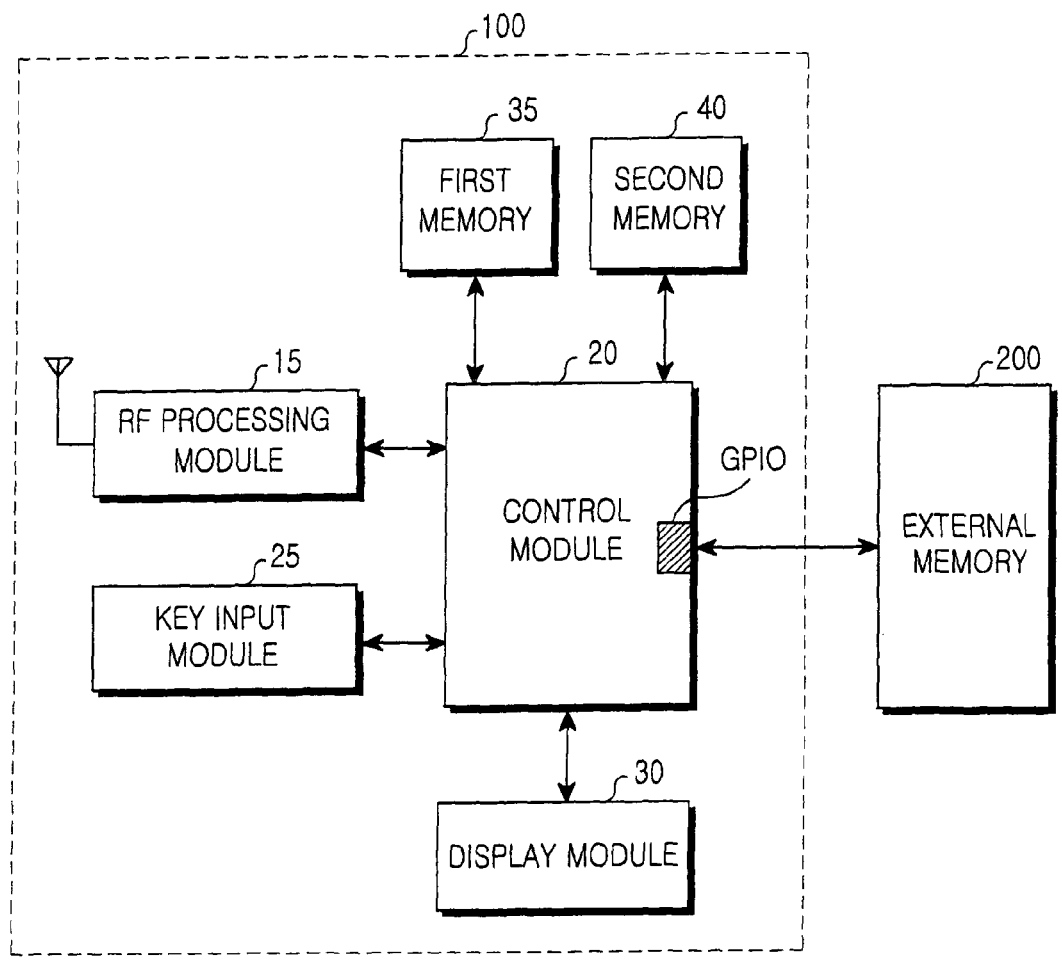
FIG. 1 is a block diagram illustrating the structure of an apparatus for installing software in a mobile communication terminal using an external memory according to one embodiment of the present invention.

Hereinafter, a preferred embodiment of the present invention will be described in detail with reference to the accompanying drawings. Note that the same or similar components in drawings are designated by the same reference numerals as far as possible although they are shown in different drawings. In the following description of the present invention, detailed description of known functions and configurations incorporated herein will be omitted when it may make the subject matter of the present invention unclear.

FIG. 1 is a block diagram illustrating the structure of an apparatus for installing software in a mobile communication terminal by using an external memory according to one embodiment of the present invention.

A dotted part having reference numeral 100 indicates the mobile communication terminal, and reference numeral 200 indicates the external memory. The mobile communication terminal 100 can detect the plugging state of the external memory 200 through the state of a GPIO (general purpose input/output) pin. The GPIO pin is positioned at a control module 20 of the mobile communication terminal 100. The control module 20 may be realized by using a QualComm MSM (mobile station modem) chip.

The control module 20 controls the overall operation of the mobile communication terminal and controls the installation of software according to the present invention. A first memory 35 may be realized using a ROM, a flash RAM, etc. In addition, the first memory 35 is used for storing software (e.g., application programs or a boot program). A second memory 40 may be realize using an SDRAM, an SRAM, etc. In addition, the second memory 40 is used for installing software. Software may be installed in order to upgrade an application program or recover a boot program.

An RF processing module 15 includes an RF transmitter for up-converting and amplifying a frequency of a signal to be transmitted and an RF receiver for low-noise amplifying a received signal and down-converting a frequency of the received signal. The RF processing module 15 receives a baseband signal from the control module 20, converts the signal into a middle-frequency signal, converts the middle-frequency signal into a high-frequency signal, and transmits the high-frequency signal to a base station through an antenna. In contrast, a high-frequency signal received from the base station through the antenna is converted into a middle-frequency signal and then a baseband signal to be provided to the control module 20.

A key input module 25 and a display module 30 are used for user interface. The key input module 25 includes a plurality of keys enabling a user to input data or a command for installing software. If the key input module 25 detects the pressing of a predetermined key, the key input module 25 delivers input data corresponding to the key to the control module 20. The display module 30 may be realized using a liquid crystal display (LCD), and displays the current state of the mobile communication terminal, a menu, and a message input by a user under the control of the control module 20. The display module 30 may also include a touch screen. Although it is not shown, the mobile communication terminal further includes a vibration module in order to display a specific state. The key input module 25 may include a light emitting diode.

Figure 2:
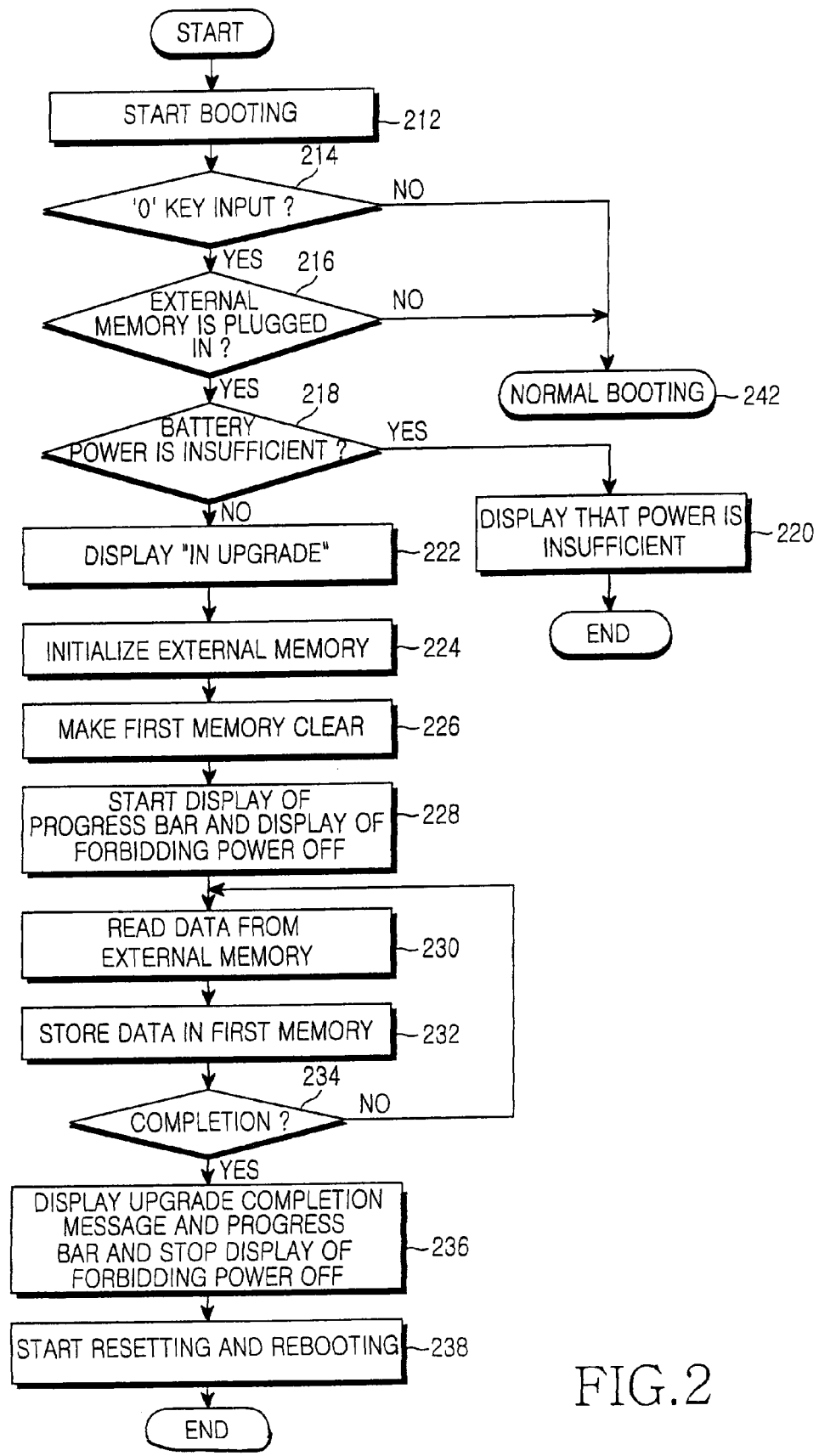
FIG. 2 is a flowchart illustrating a method for upgrading an application program of a mobile communication terminal using an external memory according to one embodiment of the present invention.

The above-described structure is only an example and may be variously changed. For example, an exclusive input/output pin assigned to an external memory can be applied to the operation in which case it may be unnecessary to employ the GPIO pin as a unit by which the mobile communication terminal 100 determines the plugging state of the external memory 200. FIG. 2 is a flowchart illustrating a method for upgrading an application program of the mobile communication terminal using the external memory according to one embodiment of the present invention.

A user copies software binary to be downloaded in the external memory. Then, the user plugs the external memory into the mobile communication terminal and then powers the mobile communication terminal on while pressing a specific key (it is assumed that the specific key is a zero key according to the present invention).

In this state, the control module 20 commences a booting operation in step 212. In step 214, the control module 20 determines if the zero key is pressed. At this time, if the zero key is pressed, the control module 20 determines in step 216 if the external memory 200 is plugged in the mobile communication terminal.

If the zero key is not pressed or if the external memory 200 is not plugged in the mobile communication terminal, the control module 20 normally performs the booting operation in step 214. In contrast, if the zero key is pressed and if the external memory 200 is plugged in the mobile communication terminal, the control module 20 recognizes that the user intends to upgrade an application program.

In step 218, the control module 20 determines if the power of a battery is insufficient. If the power of the battery has a strength less than a predetermined value, the control module 20 controls the display module 30 to display a message reporting the shortage of the power (e.g., "It is impossible to perform the upgrade due to shortage of power. Please retry the upgrade procedure after charging battery.") in step 220 and terminates the upgrade of the application program.

In contrast, if the control module 20 determines in step 218 that the power of the battery is not insufficient, the control module 20 controls the display module 30 to display a message reporting the progress of the upgrade (e.g., "An application program is being upgraded") in step 222. Then, in step 224, the control module 20 initializes the external memory 200.

In step 226, the control module 20 clears a corresponding block of the first memory 35 into which software binary is downloaded. At this time, the control module 20 may clear the whole block of the first memory 35. In addition, the control module 20 obtains the size of software binary in the external memory 200 through a file system and then may clear a block corresponding to the size.

In step 228, the control module 20 controls the display module 30 to start the display of the progress bar and display a message forbidding power off (e.g., "Please don't turn power off because software is in the process of upgrade"). Herein, the display of the progress bar is necessary in order to inform the user of the downloading progress state.

In step 230, the control module 20 reads data (software binary) from the external memory 200 by a predetermined size (e.g., 512 bytes). In step 232, the control module 20 stores the read data in a corresponding block of the first memory 35. The control module 20 then determines in step 234 if all data have been read from the external memory 200 and are stored. If all data have not been read, the control module 20 returns to step 230.

If the upgrade of the software is completed, the control module 20 controls the display module 30 to display an upgrade completion message (e.g., "The upgrade of the software is completed!") and stop the display of the progress bar and stop the display of a message of forbidding power off in step 236. In step 238, the control module 20 starts rebooting by resetting the mobile communication terminal.

The steps are performed on the premise that the upgrade operation of the application program is executed in the second memory 40. If the upgrade operation of the application program is executed in the first memory 35 (e.g., a ROM or a NOR flash memory) and a corresponding block of the first memory 35 is cleared in step 226, the upgrade operation of the program is not executed any more because all programs are deleted. Therefore, the duplication of programs necessary for the download are made in the second memory 40 before step 226 such that the programs are executed in the second memory 40.

Figure 3:
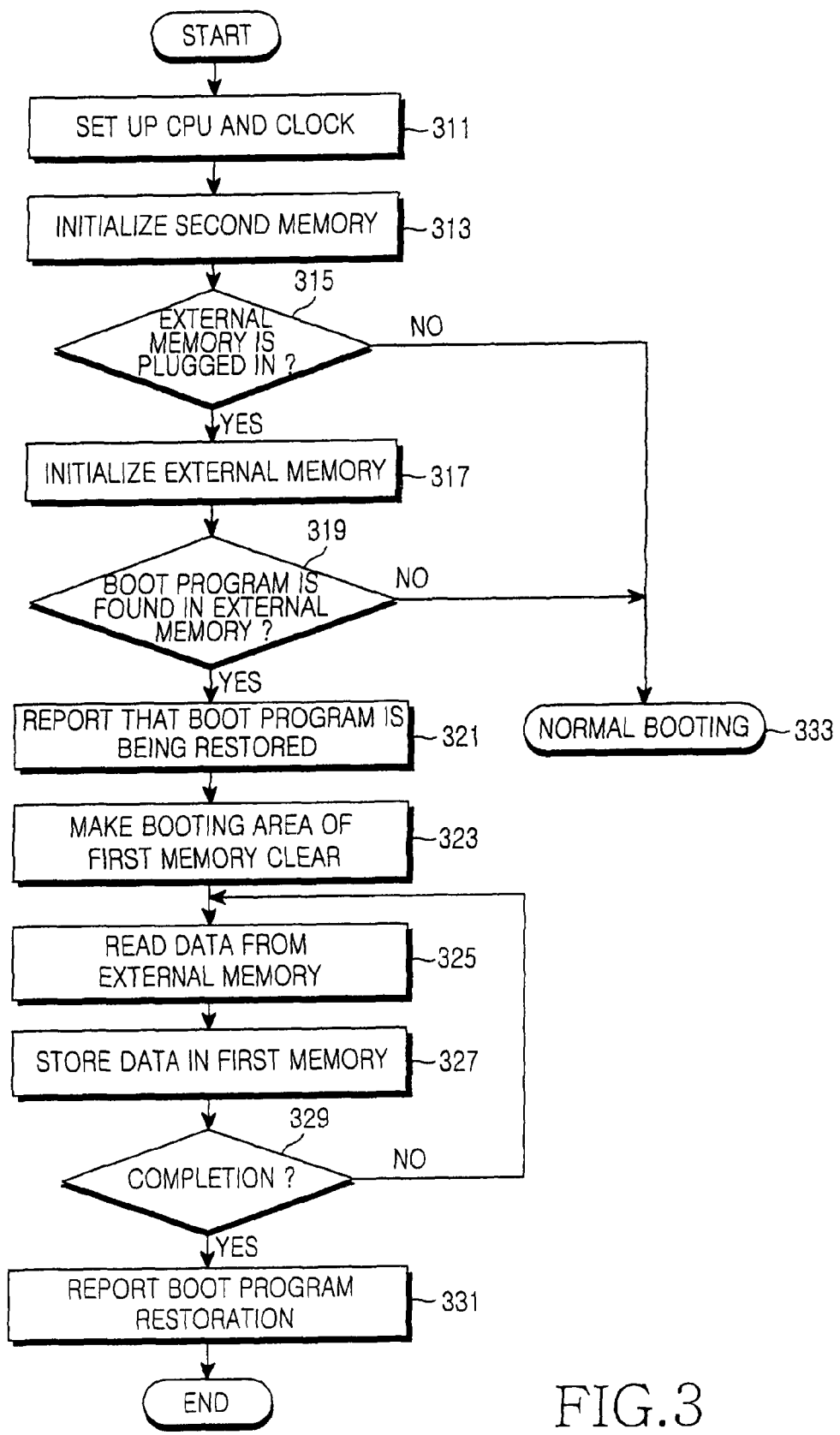
FIG. 3 is a flowchart illustrating a method for restoring a boot program to a mobile communication terminal using the external memory according to one embodiment of the present invention.

FIG. 3 is a flowchart illustrating a method for restoring a boot program to the mobile communication terminal using the external memory. The steps shown in FIG. 3 are included in a program performed before a boot program is executed. As described above, the program performed before the boot program is executed is called IPL (initial program loader) for the purpose of description. The IPL may be stored in a ROM embedded in the control module 20 or in an external processor. The IPL is a well-known technique frequently used when the boot program is stored in a NAND flash memory. Therefore, a description about the operation of the IPL will be omitted in order to prevent the subject matter of the present invention from being unclear.

In step 311, the control module 20 sets up a CPU and a clock. In step 313, the control module 20 initializes the second memory 40. In step 315, the control module 20 determines if the external memory 200 is plugged in the mobile communication terminal. If the external memory 200 is plugged in, the control module 20 initializes the external memory 200 in step 317. If not, normal booting is performed in step 333.

In step 319, the control module 20 determines if the boot program is found in the external memory 200. This is achieved by inserting a specific code value into a specific block of a boot program and confirming only the code value. If the boot program is found in the external memory 200 in step 319, the control module 20 determines the current mode as a mode for restoring the boot program and informs the user of the fact "A boot program is in the middle of restoration" in step 321. For example, the control module 20 can control a light emitting diode of the key input module 25 to blink. If the boot program is not found, normal booting is performed in step 333.

In step 323, the control module 20 clears all boot program blocks of the first memory 35. In step 325, the control module 20 reads boot program data from the external memory 200 by a predetermined size (e.g., 512 bytes). In step 327, the control module 20 stores the boot program in the first memory 35. In step 329, the control module 20 determines if all boot program data have been completely read and stored. If the all boot program data has not been completely read and stored, the control module 20 returns to step 325. If the control module 20 completely stores all boot program data in step 329, the control module 20 informs the user of "Boot program restoration". For example, the control module 20 turns a light emitting diode of the key input module 25 on or generates vibration by driving a vibration module (not shown).

If it is determined the external memory 200 is not plugged in the mobile communication terminal in step 315 or if it is determined that the boot program is not found in step 319, the control module 20 performs normal booting in step 333. In other words, the control module 20 reads the boot program to be executed in the second memory 40 from the first memory 35 and then stores the boot program in the second memory 40.

There are two methods for storing a boot program in the external memory 200 according to the present invention.

The first method employs a file system. In this case, it is enough for a personal computer to copy boot program binary in the external memory 200 using a File Allocation Table (FAT) file system. However, the IPL of a mobile communication terminal must have a file system software. Generally, it is difficult for the IPL of the mobile communication terminal to have a file system because the size of the IPL is restricted. However, the size of the IPL is not greatly expanded because the method does not require the whole file system, but only a function of reading a file by analyzing a boot sector and a FAT table.

The second method does not employ a file system. In order to copy boot program binary in the external memory, a special method must be used. In other words, it is enough to sequentially store the boot program binary from a specific sector (e.g., $0^{th}$ sector) by directly using an external memory driver software. However, since this method can be realized only by system developers, it is difficult for the general users to realize this method as compared with the first method. In contrast, it is easy to realize IPL because a file system is not required in the IPL of the mobile communication terminal.

As described above, according to the present invention, anyone who has an external memory can easily install software. It is unnecessary to employ a download program used in a personal computer and equipment such as a cable. Anyone who has an external memory card including software binary can easily upgrade programs. In addition, program download through an external memory is achieved even faster than remote program download through cable. For this reason, it is easy for users to upgrade software for themselves by bringing soft binary uploaded on the web by a mobile communication terminal provider without visiting a service center.

In addition, according to the present invention, the boot program can be automatically restored only by turning on the mobile communication terminal after copying boot program binary into an external memory card and then plugging the external memory card in the mobile communication terminal. Therefore, according to the present invention, it is easy for a service center, etc. to restore the boot program without the use of high-priced equipment such as the JTAG or a modification of the hardware of the mobile communication terminal.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. An apparatus for installing software in an electric device, the apparatus comprising:
   an external memory having software to be installed;
   a detector of the electric device for detecting a plugging state of the external memory when the external memory is plugged in to the electric device;
   a memory embedded in the electric device, the memory including a first memory and a second memory;
   a controller of the electric device for determining a current mode as a restoring mode when the software is found in the external memory, and storing the software in the memory in the restoring mode;
   a key input module including a plurality of keys used for inputting data or commands for software installation by a user, and when input of a predetermined key is detected, the key input module providing corresponding key input data to the controller; and
   a display module for displaying a state change of the electric device according to the software installation.

2. The apparatus as claimed in claim 1, further comprising a connection module through which the external memory is connected to the electric device, the connection module including a General Purpose Input/Output (GPIO) pin.

3. The apparatus as claimed in claim 1, wherein the software is finally installed in the first memory, and the second memory is used for executing the software to be installed.

4. The apparatus as claimed in claim 1, wherein the software to be installed is an application program to be upgraded.

5. The apparatus as claimed in claim 1, wherein the software to be installed is a boot program to be restored.

6. The apparatus as claimed in claim 3, wherein the first memory is a non-volatile memory.

7. A method for installing software in an electric device using an external memory having the software, the method comprising the steps of:
- determining whether the external memory is plugged in the electric device;
- determining whether software is found in the external memory;
- determining a current mode as a restoring mode when the software is found in the external memory and storing the software in an embedded memory in the restoring mode, the embedded memory including a first memory and a second memory;
- when the current mode is the restoring mode, reading data from the external memory by a predetermined size and storing the data in a corresponding block of the embedded memory all data stored in the external memory is read and stored in the embedded memory;
- inputting data or commands for software installation, by a key input module including a plurality of keys, and when input of a predetermined key is detected, providing corresponding key input data to the controller by the key input module; and
- displaying, by a display module, a state change of the electric device according to the software installation.

8. The method as claimed in claim 7, wherein the software installation includes upgrade of an application program.

9. The method as claimed in claim 8, further comprising starting rebooting by resetting the electric device when the upgrade of the application program is completed.

10. The method as claimed in claim 8, further comprising displaying an upgrade completion message when the upgrade of the application program is completed.

11. The method as claimed in claim 8, further comprising previously clearing a corresponding block of the embedded memory in order to upgrade the application program.

12. The method as claimed in claim 8, further comprising displaying a message reporting that the application program is being upgraded.

13. The method as claimed in claim 8, further comprising, before data from the external memory is read and stored, displaying a message reporting that battery power is insufficient when the battery power is checked and it is determined that the battery power is insufficient.

14. The method as claimed in claim 8, further comprising when data from the external memory starts to be read and stored, displaying a message forbidding a power off while starting to display a progress bar.

* * * * *

UNITED STATES PATENT AND TRADEMARK OFFICE
CERTIFICATE OF CORRECTION

PATENT NO. : 8,490,081 B2  
APPLICATION NO. : 13/238955  
DATED : July 16, 2013  
INVENTOR(S) : Eul-Ji Moon et al.

Page 1 of 1

It is certified that error appears in the above-identified patent and that said Letters Patent is hereby corrected as shown below:

In the Claims:

In Claim 1, column 6, lines 45-46, "An apparatus for installing software in an electric device, the apparatus comprising:" should be --An electric device comprising:--.

In Claim 2, column 6, line 64, "The apparatus" should be --The device--.

In Claim 3, column 7, line 1, "The apparatus" should be --The device--.

In Claim 4, column 7, line 4, "The apparatus" should be --The device--.

In Claim 5, column 7, line 6, "The apparatus" should be --The device--.

In Claim 6, column 7, line 8, "The apparatus" should be --The device--.

Signed and Sealed this  
Twentieth Day of August, 2013

Teresa Stanek Rea  
*Acting Director of the United States Patent and Trademark Office*